US012476542B2

(12) United States Patent
Pant et al.

(10) Patent No.: US 12,476,542 B2
(45) Date of Patent: Nov. 18, 2025

(54) SLEW RATE DETECTION IN POWER CONVERTER WITH DIGITAL CURRENT MODE CONTROL

(71) Applicant: Apple Inc., Cupertino, CA (US)

(72) Inventors: Sanjay Pant, Santa Clara, CA (US); Fabio Gozzini, San Jose, CA (US); Hubert Attah, Santa Clara, CA (US); Jonathan F. Bolus, San Francisco, CA (US); Wenxun Huang, Redwood City, CA (US); Koushik Vaithyanathan, Austin, TX (US); Alberto Puggelli, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 18/474,677

(22) Filed: Sep. 26, 2023

(65) Prior Publication Data

US 2024/0014739 A1    Jan. 11, 2024

Related U.S. Application Data

(63) Continuation-in-part of application No. 18/168,276, filed on Feb. 13, 2023, now Pat. No. 11,962,245.
(Continued)

(51) Int. Cl.
*H02M 3/157* (2006.01)
*G06F 1/3203* (2019.01)
(Continued)

(52) U.S. Cl.
CPC ........ *H02M 3/1584* (2013.01); *G06F 1/3203* (2013.01); *H02M 3/157* (2013.01); *H03M 1/12* (2013.01); *H02M 3/1586* (2021.05)

(58) Field of Classification Search
CPC ...... H02M 3/1584; H02M 3/157; H02M 1/12; G06F 1/3203; H03M 3/1586
See application file for complete search history.

(56) References Cited

U.S. PATENT DOCUMENTS 8,344,712 B2    1/2013  Martin et al.
8,624,570 B2    1/2014  O'Gorman et al.
(Continued)

FOREIGN PATENT DOCUMENTS

CN    101361272 A    2/2009
CN    108205351 A    6/2018
EP    0508454 A2    10/1992

*Primary Examiner* — Adolf D Berhane
(74) *Attorney, Agent, or Firm* — Kowert, Hood, Munyon, Rankin & Goetzel, P.C.; Dean M. Munyon

(57) ABSTRACT

A power converter with slew rate detection is disclosed. A power converter comprises a plurality of phase circuits coupled to a regulated power supply line via corresponding ones of a plurality of inductors. A first control loop generates, using digital samples and based on comparisons of a reference voltage to a voltage on the regulated power supply line, a first plurality of control signals. A second control loop, using the digital samples, generates a second plurality of control signals based on a rate of change of the voltage of the regulated power supply line. The second control loop causes the first control loop to control the plurality of phase circuits in response to detecting that the rate of change is within a specified range, and causes the second control loop to control the plurality of phase circuits, in response to detecting that the rate of change exceeds the specified range.

20 Claims, 14 Drawing Sheets

Related U.S. Application Data which is a continuation of application No. 17/661,693, filed on May 2, 2022, now Pat. No. 11,581,813, which is a continuation of application No. 17/201,712, filed on Mar. 15, 2021, now Pat. No. 11,323,033, which is a continuation of application No. 16/877,260, filed on May 18, 2020, now Pat. No. 10,951,118, which is a continuation of application No. 16/387,316, filed on Apr. 17, 2019, now Pat. No. 10,658,931.

(51) Int. Cl.
*H02M 3/158* (2006.01)
*H03M 1/12* (2006.01)

(56) References Cited

U.S. PATENT DOCUMENTS

| | | |
|---|---|---|
| 9,484,815 B2 | 11/2016 | Dally |
| 9,857,854 B2 | 1/2018 | Zhang et al. |
| 10,063,149 B2 | 8/2018 | Akre et al. |
| 10,658,931 B1 | 5/2020 | Pant et al. |
| 10,678,200 B2 | 6/2020 | Matsuoka et al. |
| 10,951,118 B2 | 3/2021 | Pant et al. |
| 11,323,033 B2 | 5/2022 | Pant |
| 11,581,813 B2 | 2/2023 | Pant et al. |
| 11,962,245 B2 * | 4/2024 | Pant .................... H02M 3/1584 |
| 2007/0013350 A1 | 1/2007 | Tang et al. |
| 2008/0267301 A1 | 10/2008 | Alfano et al. |
| 2008/0272752 A1 | 11/2008 | Qiu et al. |
| 2009/0174262 A1 | 7/2009 | Martin et al. |
| 2010/0328968 A1 | 12/2010 | Adragna et al. |
| 2011/0084673 A1 | 4/2011 | Chang et al. |
| 2011/0241640 A1 | 10/2011 | Qiu et al. |
| 2016/0268904 A1 | 9/2016 | Melendy et al. |
| 2018/0083534 A1 | 3/2018 | Pant et al. |
| 2018/0191333 A1 | 7/2018 | Chen et al. |
| 2018/0248481 A1 | 8/2018 | Couleur et al. |
| 2018/0337599 A1 | 11/2018 | Chen et al. |
| 2019/0273455 A1 | 9/2019 | Lau |
| 2019/0305552 A1 | 10/2019 | Cao et al. |
| 2019/0305560 A1 | 10/2019 | Wang et al. |
| 2022/0109368 A1 | 4/2022 | Zhou et al. |
| 2023/0188130 A1 | 6/2023 | Bondade et al. |

\* cited by examiner

SLEW RATE DETECTION IN POWER CONVERTER WITH DIGITAL CURRENT MODE CONTROL

PRIORITY INFORMATION

The present application is a continuation-in-part of U.S. application Ser. No. 18/168,276, entitled "DIGITAL CURRENT MODE CONTROL FOR MULTI-PHASE VOLTAGE REGULATOR CIRCUITS," filed Feb. 13, 2023, which is a continuation of U.S. application Ser. No. 17/661,693, entitled "DIGITAL CURRENT MODE CONTROL FOR MULTI-PHASE VOLTAGE REGULATOR CIRCUITS," filed May 2, 2022 (now U.S. Pat. No. 11,581,813), which is a continuation of U.S. application Ser. No. 17/201,712, entitled "DIGITAL CURRENT MODE CONTROL FOR MULTI-PHASE VOLTAGE REGULATOR CIRCUITS," filed Mar. 15, 2021 (now U.S. Pat. No. 11,323,033), which is a continuation of U.S. application Ser. No. 16/877,260, entitled "DIGITAL CURRENT MODE CONTROL FOR MULTI-PHASE VOLTAGE REGULATOR CIRCUITS," filed May 18, 2020 (now U.S. Pat. No. 10,951,118), which is a continuation of U.S. application Ser. No. 16/387,316, entitled "DIGITAL CURRENT MODE CONTROL FOR MULTI-PHASE VOLTAGE REGULATOR CIRCUITS," filed on Apr. 17, 2019 (now U.S. Pat. No. 10,658,931); the disclosures of each of the above-referenced applications are incorporated by reference herein in their entireties.

BACKGROUND

Technical Field

This disclosure relates to power management in computer systems and, more particularly, to voltage regulator circuit operation.

Description of the Related Art

Modern computer systems may include multiple circuits blocks designed to perform various functions. For example, such circuit blocks may include processors, processor cores configured to execute software, or program instructions. Additionally, the circuit blocks may include memory circuits, mixed-signal or analog circuits, and the like.

In some computer systems, the circuit blocks may be designed to operate using different power supply voltage levels. For example, in some computer systems, power management circuits (also referred to as "power management units") may generate and monitor various power supply signals.

Power management circuits often include one or more power converter circuits configured to generate regulated voltage levels on respective power supply signal lines using a voltage level of an input power supply signal. Such converter circuits may employ multiple reactive circuit elements such as inductors, capacitors, and the like.

SUMMARY

A power converter with slew rate detection is disclosed. In one embodiment, a power converter comprises a plurality of phase circuits coupled to a regulated power supply line via corresponding ones of a plurality of inductors, wherein the plurality of phase circuits are configured to modify a voltage level of the regulated power supply line using respective ones of a plurality of control signals. The power converter further includes a first control loop configured to generate, using a plurality of digital samples and based on comparisons of a value corresponding to a reference voltage to a voltage level on the regulated power supply line, a first plurality of control signals. A second control loop is configured to, using the plurality of digital samples, generate a second plurality of control signals based on determining a rate of change of the voltage level of the regulated power supply line. The second control loop is further configured to cause the first control loop to control the plurality of phase circuits, using the first plurality of control signals, in response to detecting that the rate of change is within a specified range, and cause the second control loop to control the plurality of phase circuits, using the second plurality of control signal, in response to detecting that the rate of change exceeds the specified range.

Figure 1A:
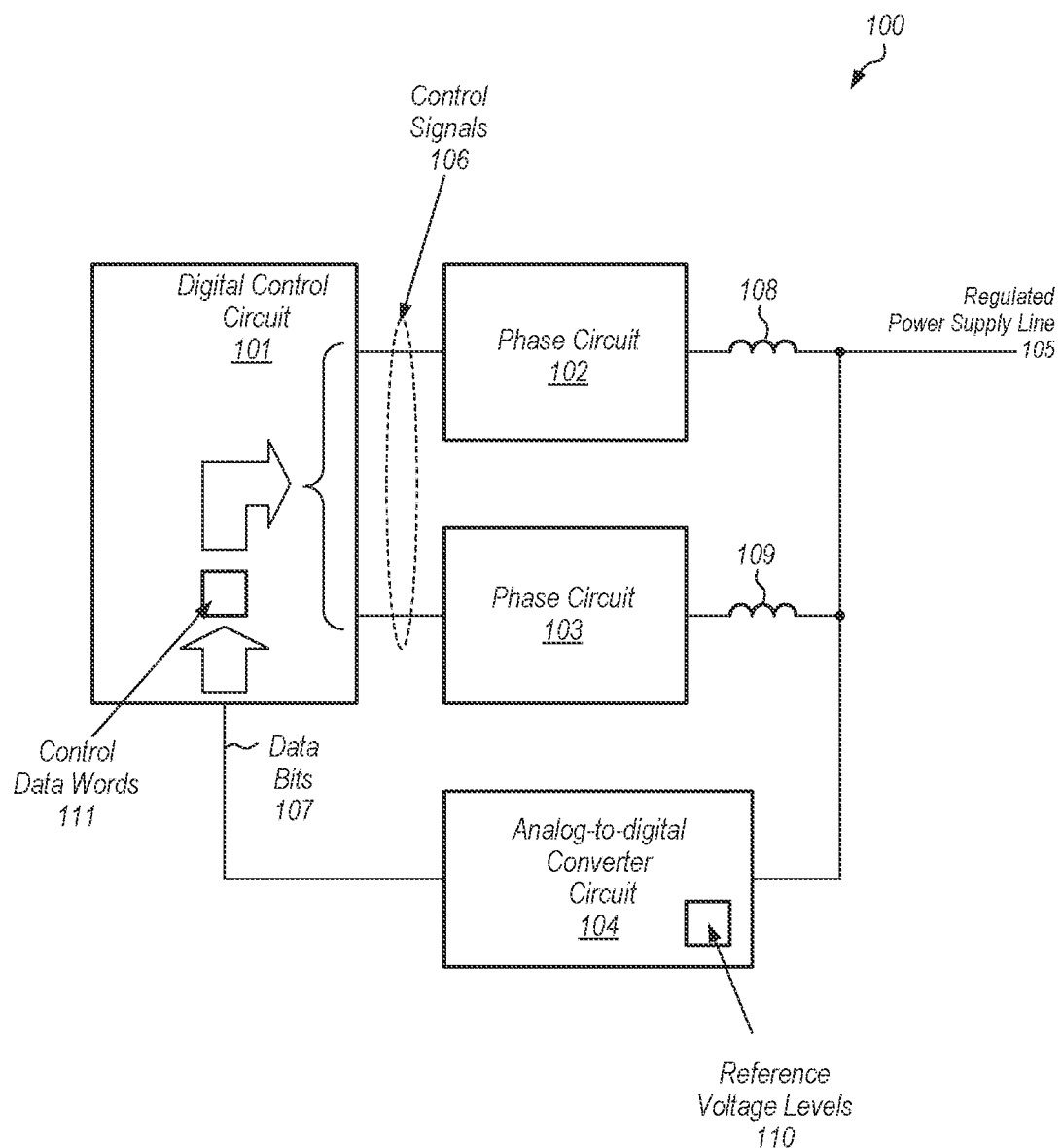
FIG. 1A is a block diagram of an embodiment of a power converter circuit for a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular forms illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (1) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter or voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Many power converter and voltage regulator circuits employ a control loop, which senses a particular characteristic of a regulated power supply signal and compares a value of the particular characteristic to a threshold value. Based on results of the comparison, charging or discharging of a load circuit by a power converter or voltage regulator circuit may be halted.

In some cases, a power converter or voltage regulator circuit may include multiple phase circuits, each configured to activate at different time points to either source or sink current to a load circuit. Each phase circuit is controlled by a corresponding control loop that determines when each phase circuit halts operation once started.

Such control loops implemented in an analog fashion may be complex and difficult to design. For example, in a power converter or voltage regulator circuit that employs multiple phase circuits with coupled inductors, a determination must be made as to how to distribute current among the phases in order to maintain stability and gain of the control loops. Failure to maintain stability and gain of the control loops can result in the power converter or voltage regulator circuit being unable to maintain a target voltage level on the line for the regulated power supply signal. The embodiments illustrated in the drawings and described below may provide techniques for generating control signals for the phase circuits in the digital domain in order to reduce complexity, improve stability, and allow for simplified initialization.

The disclosure further contemplates the use of a second control loop, also in the digital domain, that may be used to implement control based on the rate of change of the voltage level on the regulated power supply line (this change is alternately referred to herein as the slew rate, or dV/dT). The digital control circuit discussed above may provide a first plurality of control signals to the plurality of phase circuits as part of a first control loop. A slew rate detection circuit may provide a second plurality of control signals to the phase circuits as part of a second control loop. The slew rate detection circuit may used digital samples of the voltage level on the regulated supply line to determine its rate of change. If the rate of change is out of a specified range (e.g., exceeds one of one or more thresholds), the slew rate detection circuit may cause the second plurality of control signals to be provided to the phase circuits in lieu of the first plurality of control signals. This may cause a reduction in the rate of change of the voltage level on the regulated supply line to prevent, e.g., overshoots or voltage droops. When the rate of change is back within the specified range, control of the phase circuits may be returned to the first control loop, with the first plurality of control signals provided to the phase circuits in lieu of the second plurality.

A block diagram depicting an embodiment of a power converter circuit, without slew rate detection, is depicted in FIG. 1A. As illustrated, power converter circuit 100 includes digital control circuit 101, phase circuits 102 and 103, and analog-to-digital converter circuit 104. Although only two phase circuits are depicted in the embodiment illustrated in FIG. 1A, in other embodiments, any suitable number of phase circuits may be employed.

Phase circuits 102 and 103 are each coupled to regulated power supply line 105 via inductors 108 and 109, respectively, and are configured to modify a voltage level of regulated power supply line 105 using a respective one of control signals 106. Each of phase circuits 102 and 103 may be separately enabled by respective timing or clock signals to source current to regulated power supply line 105. Once enabled, the duration of how long current is sourced to regulated power supply line 105 is determined based on current sensed through inductors 108 and 109 using a process commonly referred to as pulse width modulation or "PWM."

To perform PWM, control currents (also referred to as "demand currents") are compared to currents sensed through inductors 108 and 109. The voltage levels of control signals 106 may correspond to such control currents, which each of phase circuits 102 and 103 may compare to currents sensed through inductors 108 and 109, respectively. Based on results of the comparisons, phase circuits 102 and 103 may halt the sourcing of current into regulated power supply line 105 and allow current to flow back from regulated power supply line 105 into a ground supply signal.

Analog-to-digital converter circuit 104 is configured to compare a voltage level of regulated power supply line 105 to reference voltage levels 110 to generate data bits 107. As described below in more detail, analog-to-digital converter circuit 104 may generate reference voltage levels 110 using a divider circuit and may include multiple comparator circuits, each configured to compare the voltage level of regulated power supply line 105 to a corresponding one of reference voltage levels 110.

Digital control circuit 101 is configured to generate control data words 111 using data bits 107 and to generate a corresponding one of control signals 106 using a corresponding one of control data words 111. As used herein, a digital control circuit differs from an analog control circuit in that processing is performed in the digital domain using multiple logic gates. A digital control circuit does not perform analog processing operations such as current multiplication, voltage multiplication, and the like. By processing data bits 107 in the digital domain, the distribution of an overall demand current among phase circuits 102 and 103 can be more easily determined than using analog control loops and circuits, thereby reducing complexity and improving stability of power converter circuit 100.

Figure 1B:
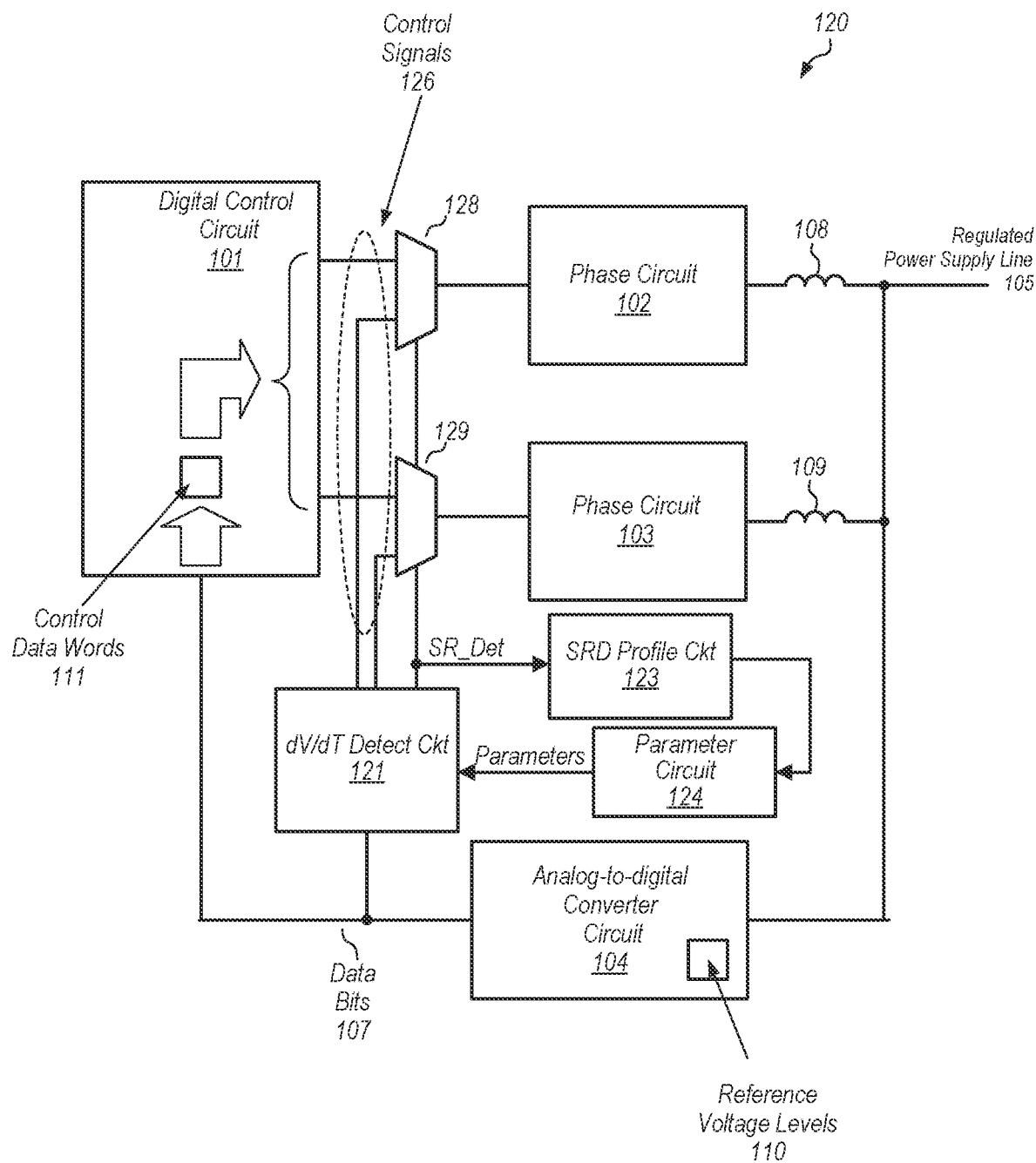
FIG. 1B is a block diagram of another embodiment of a power converter circuit for a computer system.

FIG. 1B is a block diagram of another embodiment of a power converter circuit, this embodiment including slew rate detection. In the embodiment shown, power converter 120 includes a first control loop having digital control circuit 101, which may function similarly to that shown in FIG. 1A. Digital control circuit 101 may output a plurality of control signals that are part of control signals 126, to selection circuits 128 and 129 (it is noted that the number of selection circuits may vary with the number of phase circuits in various embodiments).

Power converter 120 also includes a plurality of phase circuits 102 and 103 (and may include more than the two shown here), and an analog-to-digital converter circuit 104 configured to convert the voltage on the regulated power supply line 105 into a plurality of digital samples comprising data bits 107.

Power converter 120 also includes second and third control loops, both of which includes slew rate (dV/dT) detection circuit 121. In the second control loop, slew rate detection circuit 121 receives the same plurality of digital samples made up of data bits 107 as also received by digital control circuit 101. Slew rate detection circuit 121 is configured to, in the digital domain, determine a rate of change of the voltage level on the regulated power supply line 105. In response to determining that the rate is changing too fast (increasing too fast or decreasing too fast), slew rate detection circuit 121 may assert the SR_Det signal, which acts as a selection signal for selection circuits 128 and 129. When SR_Det is asserted, selection circuits 128 and 129 select the second plurality of control signals output from slew rate detection circuit 121 to be provided to phase circuits 103. In effect, the second control loop overrides the first control loop when the rate of change of the voltage level on regulated supply line 105 is out of the specified range. The second control loop may maintain control of the phase circuits until such time that the rate of change of the voltage level returns to within the specified range. Thereafter, control of power converter 120 may be transferred back to the first control loop. In some embodiments, some hysteresis may be implemented in this control loop, both with respect to the point at which control is transferred to the second control loop, as well as the point at which control is transferred back to the first control loop.

In determining the rate of change of the voltage level, slew rate detection circuit 121 may calculate, in the digital domain, a difference in voltage between two successive samples of the voltage on regulated power supply line 105. In some embodiments, more than two samples may be used to determine an average rate of change over some specified interval or number of samples. The calculated rate of change may be compared to one or more thresholds to determine if the rate of change is within a specified range. For example, in one embodiment, the calculated rate of change may be compared to an upper threshold (indicating a positive rate of change, with the voltage increasing) and a lower threshold (indicating a negative rate of change, with the voltage decreasing). If the calculated rate of change is above the lower threshold but less than the upper threshold, it may be considered to be within the specified range. However, if the calculated rate of change is either greater than the upper threshold or less than the lower threshold, slew rate detection circuit 121 may trigger assertion of the SR_Det signal, causing the selection circuits 128 and 129 (and more generally, all selection circuits in a given embodiment) to switch control of the phase circuits from the first control loop to the second control loop. Upon making the switch, phase circuits 102 and 103 (and more generally, all phase circuits) operate in accordance with the second plurality of control signals, providing from slew rate detection circuit 121, in lieu of the first.

In assuming control of the phase circuits upon switching to the second control loop, slew rate detection circuits 121 may generate the second plurality of control signals to cause the various phase circuits of a given embodiment (including that which is shown here) to operate to reduce the rate of change back into the specified range. For example, if the rate of change is less than the lower threshold, indicating that the voltage on regulated power supply line 105 is falling towards an undesired voltage droop, slew rate detection circuit may generate the plurality of second control signals to increase the total current that is output to the load by the various phase circuits. These actions can include (but are not limited to) enabling additional phases (if one or more phases is disabled), increasing a switching frequency of one or more of the phase circuits (e.g., when the phase circuits are operating in pulse frequency modulation [PFM] mode), increasing the duty cycle/pulse width of one or more phase circuits (e.g., when operating in a pulse width modulation [PWM] mode), and/or switching one or more phase circuits from PFM mode to PWM mode. Such actions may reduce the rate of change or even change the direction at which the voltage is moving. Furthermore, these actions may also prevent or reduce the duration of a voltage droop while helping the voltage level on regulated power supply line 105 to recover to or remain within its specified limits.

In the case in which the calculated rate of change is above the upper threshold (meaning an overshoot is possible or has already occurred), slew rate detection circuit 121 may carry out actions to reduce the amount of current provided by the various phase circuits to thus reduce/eliminate any voltage overshoot on the regulated power supply line 105. These actions may include, but are not limited to, disabling one or more phase circuits, reducing a switching frequency of one or more circuits operating in a PFM mode, reducing a duty cycle/pulse width of one or more phase circuits operating in a PWM mode, and/or switching from operation in a PWM mode to a PFM mode.

It is noted that in carrying out the corrective actions discussed above, normal control may be returned gradually to prevent an occurrence of the opposite condition. For example, if slew rate detection circuit 121 has caused control to be assumed by the second control loop in order to prevent or correct a voltage droop, upon recovery from this condition, slew rate detection circuit 121 may allow operation of power converter 120 to stabilize before returning control to digital control circuit 101. Such actions may include (but are not limited to) reducing a pulse width when operating in PWM mode, switching from PWM to PFM mode, or reducing a switching frequency in PFM mode. Gradually stabilizing operation before returning control back to digital control circuit 101 may prevent the occurrence of the opposite condition, e.g., prevent recovery from a voltage droop from causing a voltage overshoot.

It is noted that for both digital control circuit 101 and slew rate detection circuit 121 may, when selected, carry out control of the various phase circuits independently with respect to one another in various embodiments of a power converter according to this disclosure.

A third control loop in power converter 120 is used to set the parameters for slew rate detection circuit 121. This control loop includes SRD (slew rate detect) profile circuit 123 and parameter circuit 124. SRD profile circuit 123 in the embodiment shown is coupled to receive the SR_Det signal from slew rate detect circuit 121. In some embodiments, slew rate detection circuit 121 may provide additional information to SRD profile circuit 123, such as whether a particular incident that triggered assertion of the SR_Det signal was due to a positive or a negative rate of change. Using the information received from slew rate detection circuit 121, SRD profile circuit 123 may generate information regarding a rate at the SR_Det circuit is asserted, thus indicating how often rates of change outside of the specified range are detected using the current thresholds. The information may also indicate whether the SR_Det signal is more often triggered due to a positive or a negative rate of change. In some embodiments, a recovery duration may also be provided by SRD profile circuit, the duration indicating the amount of time between the assertion of the SR_Det signal and the time at which control is returned to the first control loop after the rate of change has returned to within the specified range.

The information generated by SRD profile circuit 123 is provided to parameter circuit 124, which may then adjust the parameters, such as the thresholds, used to determine whether the rate of change of the voltage on regulated power supply line 105 is within a specified range or not. In some embodiments, parameter circuit 124 may also generate information regarding hysteresis and any delay time that should be observed before triggering assertion of the SR_Det signal and transferring control of the phase circuits to the second control loop. This may prevent too frequent switches between the control loops that may be caused by, e.g., transient, short-lived changes to the rate of change of the voltage level on regulated power supply line 105.

In determining the thresholds parameter circuit may, in some embodiments, determine a positive threshold and a negative threshold independently of one another. In other embodiments, the thresholds may be adjusted together, and in some cases, the specified range may maintain a constant size. However, embodiments are possible and contemplated in which the range varies as it is updated.

Newly generated parameters are provided from parameter circuit 124 to slew rate detection circuit 121. Within the latter of these, the updated parameters are then used to evaluate the rate of change of the voltage level on regulated power supply line 105 to determine if it is within the newly updated parameters. By updating the parameters such as the thresholds from time to time, slew rate detection circuit 121 may carry out more effective control of the phase circuits during events in which the rate of change exceeds specified limits, while also making more effective decisions in determining when control should be passed between the first and second control loops.

Figure 2:
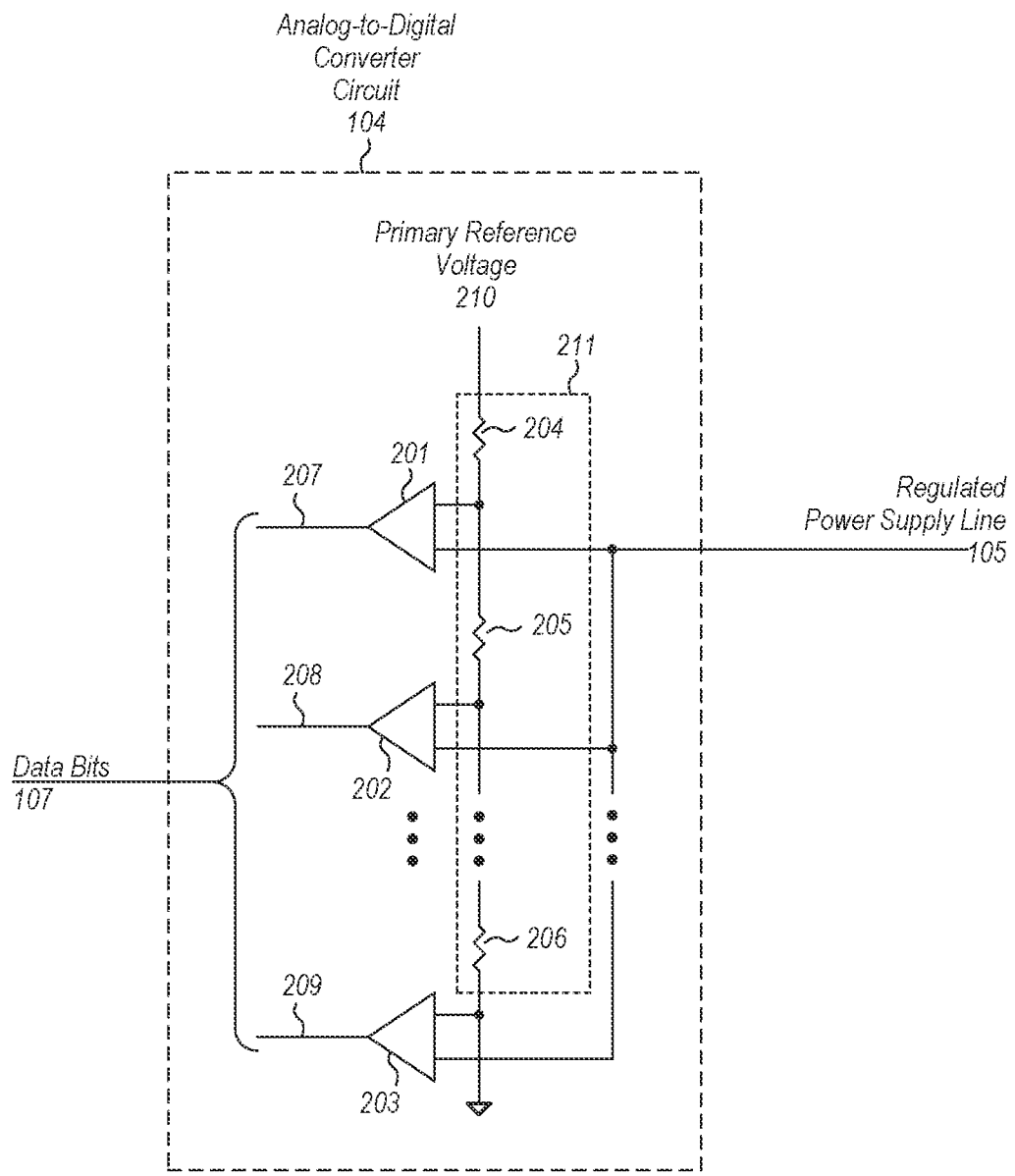
FIG. 2 illustrates a block diagram of an embodiment of an analog-to-digital converter circuit.

Turning to FIG. 2, an embodiment of analog-to-digital converter circuit 104 is depicted. In various embodiments, analog-to-digital converter circuit 104 may be a particular embodiment of a flash analog-to-digital converter circuit. As used and described herein, a flash analog-to-digital converter circuit is an analog-to-digital converter circuit that employs a linear voltage divider circuit to generate multiple reference voltage levels from a primary voltage reference, and multiple comparator circuits each configured to compare the input voltage level to a corresponding one of the multiple reference voltage levels. As illustrated, analog-to-digital converter circuit 104 includes comparator circuits 201-203 and voltage divider circuit 211.

Voltage divider circuit 211 may be a particular embodiment of a resistive voltage divider circuit and includes resistors 204-206 coupled together in a serial fashion. Resistor 204 is coupled to primary reference voltage 210, and resistor 206 is coupled to a ground supply signal. As current flows through resistors 204-206, a voltage is dropped across each one of resistors 204-206. For example, in some embodiments, the voltage drop across a particular one of resistors 204-206 may be in a range of 1 mV to 3 mV. Although resistor 204 is depicted as being coupled to primary reference voltage 210, in other embodiments, primary reference voltage 210 may be coupled between any two resistors included in voltage divider circuit 211. In such cases, resistors at the ends of the serial chain of resistors, e.g., resistors 204 and 206, may be coupled to the ground supply signal.

Each generated voltage is used as an input to a corresponding one of comparator circuits 201-203. It is noted that although voltage divider circuit 211 is depicted as using resistors, in other embodiments, voltage divider circuit 211 may employ capacitors or any other suitable combination of circuit elements.

The value of resistors 204-206 may be any suitable combination of values. For example, in some cases, resistors 204-206 may all provide the same resistance value, while in other cases, each of resistors 204-206 may provide a different resistance value. In various embodiments, each of resistors 204-206 may be fabricated from polysilicon, metal, or any other suitable material available in a semiconductor manufacturing process. In some cases, resistors 204-206 may be fabricated on a silicon or other substrate different from one on which comparator circuits 201-203 are fabricated. Although only three resistors are shown in voltage divider circuit 211, in other embodiments, any suitable number of resistors may be employed.

Comparator circuits 201-203 may be particular embodiments of differential amplifier circuits, or any other suitable comparator circuits configured to generate an output voltage level proportional to a difference between the voltage levels of two input signals. As illustrated, comparator circuit 201 is configured to compare the voltage level of regulator power supply line 105 to a voltage level generated by the voltage drop generated by resistor 204. In a similar fashion, comparator circuits 202 and 203 are configured to compare the voltage level of regulated power supply line 105 to voltage levels generated by the voltage drops generated by resistors 205 and 206, respectively.

Comparator circuits 201-203 may be further configured to generate data bits 207-209, which are included in data bits 107, at periodic time intervals. For example, comparator circuit 201 may output a new value for data bit 207 each nanosecond. Although only three comparator circuits are depicted in the embodiment of FIG. 2, in other embodiments, any suitable number of comparator circuits may be employed.

Figure 3A:
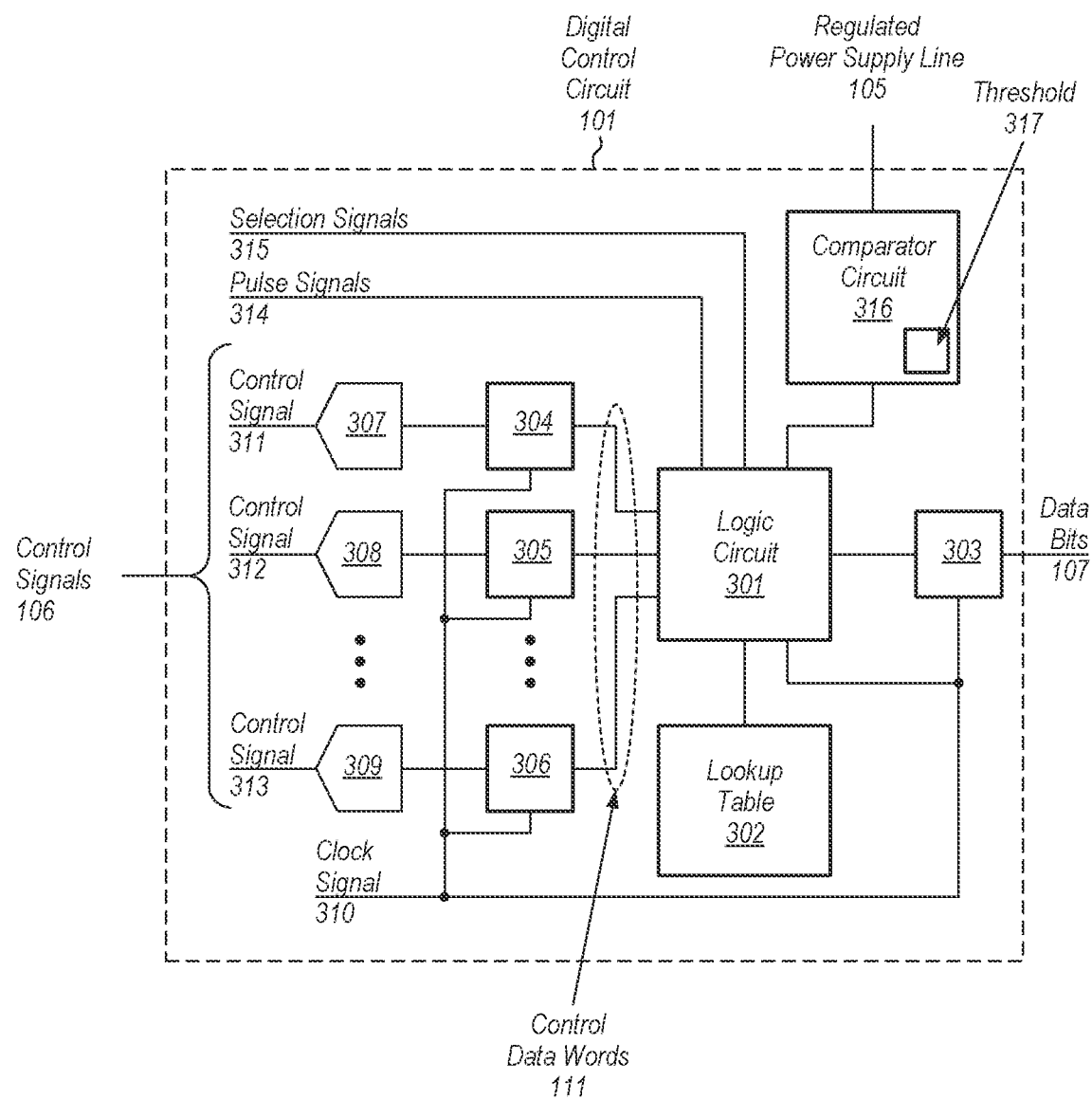
FIG. 3A illustrates a block diagram of an embodiment of a control circuit for a power generator circuit.

A block diagram depicting an embodiment of digital control circuit 101 is illustrated in FIG. 3A. As illustrated, digital control circuit 101 includes logic circuit 301, lookup table 302, register circuits 303-306, digital-to-analog converter circuits 307-309, and comparator circuit 316.

Register circuit 303 may include multiple latch or flip-flop circuits, each configured to store a respective one of data bits 107 using clock signal 310. For example, on each rising edge of clock signal 310, a particular one of the latch or flip-flop circuits in register circuit 303 may sample and hold a value of a corresponding one of data bits 107 for use by logic circuit 301. Clock signal 310 may be of any suitable frequency. For example, in some embodiments, the frequency of clock signal 310 may be 1 GHz.

Logic circuit 301 may be configured to generate control data words 111 using the output of register circuit 303 and clock signal 310. In some cases, the processing may include determining an allocation of the overall demand current to individual phase circuits. In various embodiments, logic circuit 301 may be a particular embodiment of a state machine or sequential logic circuit. In other embodiments, logic circuit 301 may be a processor or controller circuit configured to execute instructions stored in a memory circuit (not shown). Logic circuit 301 may be placed in a particular state or otherwise initialized during a reset or boot operation. In some cases, logic circuit 301 may process the stored versions of data bits 107 such that an effective gain through digital control circuit 101 may be adjusted. By adjusting the effective gain through digital control circuit 101, a desired load line for power converter circuit 100 may be achieved. As used herein, a load line refers to a relationship between an output voltage of a power converter circuit and an output current of the power converter circuit. Precise control over the power converter's load line may be used to save power when processor circuits are experiencing heavy loads.

Each of register circuits 304-306 is configured to store the data bits included in each one of control data words 111 using clock signal 310. In various embodiments, a number of latch or flip-flop circuits included in each of register circuits 304-306 may correspond to a number of data bits included in a given one of control data words 111. For example, in some embodiments, the given one of control data words 111 includes five data bits, and each of register circuits 304-306 include five latch or flip-flop circuits. Although three control data words are depicted in FIG. 3A in other embodiments, any suitable number of control data words may be employed.

Each of digital-to-analog converter circuits 307-309 are configured to generate a respective voltage level on control signals 311-313 (all part of control signals 106) using a corresponding one of control data words 111. For example, digital-to-analog converter circuit 307 is configured to generate a voltage level on control signal 311 based on the particular one of control data words 111 stored in register circuit 304. As clock signal 310 toggles, new values for control data words 111 are stored in register circuits 304-306. Digital-to-analog converter circuits 307-309, using the new values for control data words 111 stored in register circuits 304-306, may then update the voltage levels on control signals 311-313.

Comparator circuit 316 is configured to compare a voltage level of regulated power supply line 105 to threshold 317. In various embodiments, comparator circuit 316 may be a particular embodiment of a differential amplifier or other circuit configured to generate an output signal based on a difference between voltage levels of two input signals. In some cases, comparator circuit 316 is configured to generate a digital output signal that can be used by logic circuit 301.

Logic circuit 301 is further configured to generate pulse signals 314 and selection signals 315 based on results from comparator circuit 316. As described below, pulse signals 314 and selection signals 315 may be used by phase circuits, e.g., phase circuit 102, to bypass internal control circuits within the phase circuits and directly source and sink current from regulated power supply line 105.

In various embodiments, to generate pulse signals 314 and selection signals 315, logic circuit 301 may retrieve information from lookup table 302. Such information may be used by logic circuit 301 to determine the duration of pulse signals 314, and the like. The retrieval of information from lookup table 302 may be based on a magnitude of the voltage level of regulated power supply line 105, a difference between the voltage level of regulated power supply line 105 and threshold 317, or any other suitable criteria. It is noted that, in some cases, a particular pulse may be truncated by logic circuit 301 in response to a determination that the voltage level of regulated power supply line 105 exceeds an upper threshold value.

Lookup table 302 may be a particular embodiment of a static random-access memory, register file circuit, non-volatile memory circuit, or any other suitable circuit configured to store the aforementioned information. In various embodiments, the information may be stored in lookup table 302 during an initialization or boot process. In some cases, the information stored in lookup table 302 may be modified during operation based on performance characteristics of the power converter circuit, the computer system, or any other suitable criteria.

Figure 3B:
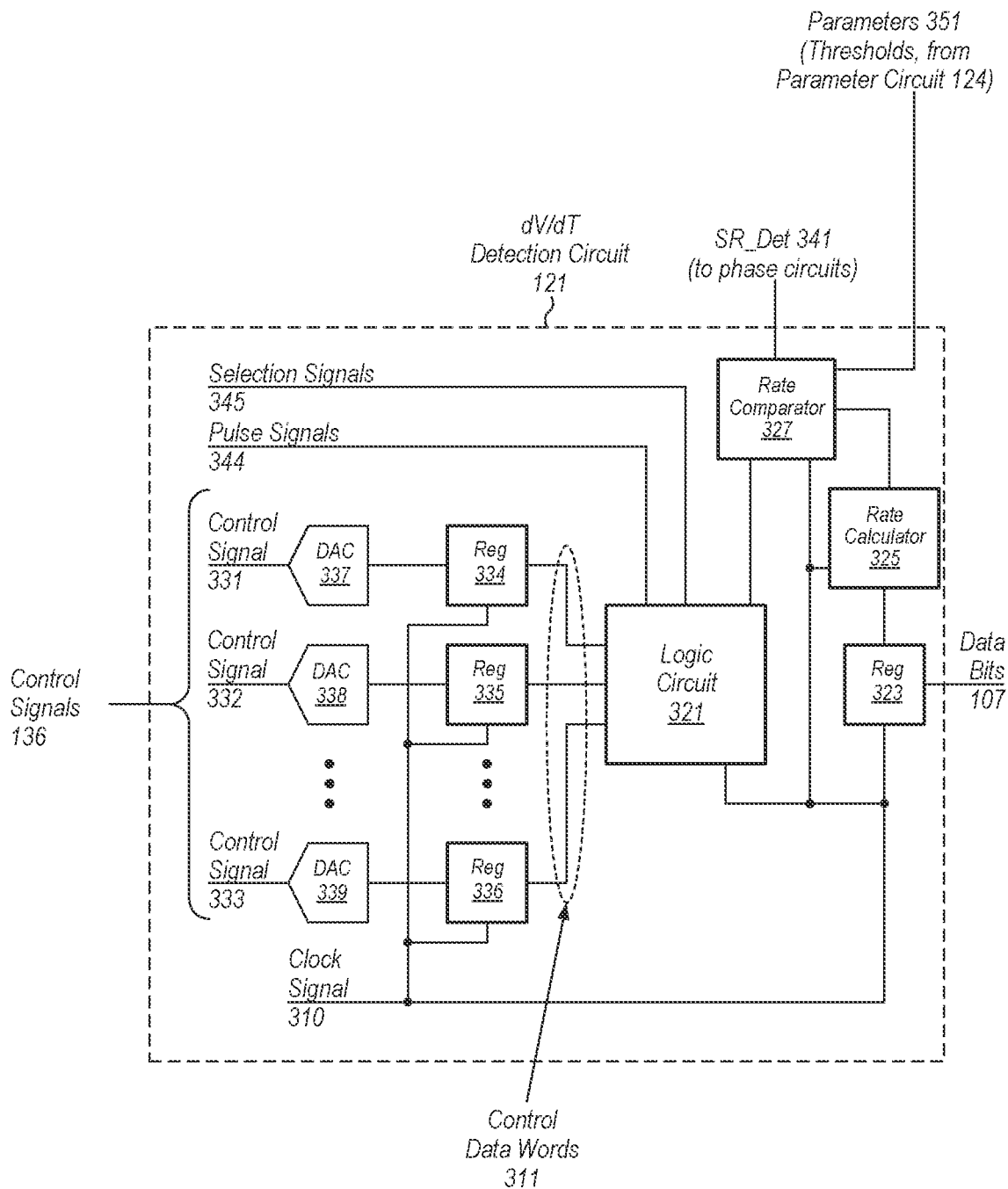
FIG. 3B is a block diagram of one embodiment of a slew rate (dV/dT) detection circuit.

FIG. 3B is a block diagram of one embodiment of a slew rate (dV/dT) detection circuit. In the embodiment shown, slew rate detection circuit 121 includes a logic circuit 321, register 323, rate calculator 325, and rate comparator 327, each of which is coupled to receive and operate in accordance with clock signals 310. Slew rate detection circuit 121 also includes a plurality of registers coupled to receive control data words 311 from logic circuit 321, and a plurality of digital-to-analog converters 337-339 configured to convert the control data words 311 into analog control signals 331-333.

Logic circuit 321 is configured to generate the control data words 311, which are provided to registers 334-336 (the number of registers may vary from one embodiment to another). From registers 334-336, the control data words are provided to corresponding digital-to-analog converter (DAC) circuits 337-339 (which may also vary in number among different embodiments). The various DAC circuits 337-339 in turn may convert the control data words into analog signals which serve as correspondingly generated control signals 331-333, which are then provided as part of the second plurality of control signals to the phase circuits. Logic circuit 321 in the embodiment shown is also configured to generate pulse signals 344 and selection signals 344, which are also provided as part of the second plurality of control signals to the various phase circuits. These control signals may carry out similar functions to the first plurality of control signals, although their generation is based on a the rate of change of the voltage level on regulated power supply line 105 rather than the current value of the voltage level itself. It is noted that, in various embodiments, generation of the second plurality of control signals may be carried out in a continuous manner even when the power converter of the present disclosure is operating under control of the first control loop. The continuous generation of these control signals may enable a smoother transition when control is shifted from the first control loop to the second control loop.

Slew rate detection circuit 121 also includes a register 323 (or, alternatively a buffer to carry out the same function), a rate calculator circuit 325, and a rate comparator circuit 327. Register 323 in the embodiment shown is coupled to receive the data bits 107 that make up the plurality of digital samples generated by analog-to-digital converter circuit 104 of FIG. 1B. The samples may be temporarily stored in register 323 (which may include multiple storage locations) before being forwarded on to rate calculator 325.

In the embodiment shown, rate calculator 325 includes circuitry for carrying out various operations to calculate a rate of change of the voltage level on regulated power supply line 105 using the digital samples received from analog-to-digital converter circuit 104. In calculating the rate of change, rate calculator 325 may determine a difference in voltage levels as indicated by at least two consecutive samples to determine, e.g., an instantaneous rate of change. In some embodiments, rate calculator 325 may determine, e.g., an average rate of change over a number of consecutive samples to get a clearer picture of how the voltage level is changing, as well as to average out any samples that are outliers due to very short-lived transients (e.g., having a length corresponding to a single sample).

The rate of change calculated by rate calculator 325 is forwarded to rate comparator 327, which is also coupled to receive parameters, including thresholds, from parameter circuit 124. Using the received parameters, rate comparator 327 may compare the calculated rate of change to the various thresholds, and may also use other information, such as hysteresis information included in the parameters, to determine whether the rate of change is within the specified range. If the rate is within the specified range and within the prescribed parameters (e.g., such as hysteresis parameters) it may hold the SR_Det signal 341 as de-asserted. On the other hand, if the rate is outside of the specified range, rate comparator 327 asserts the SR_Det signal 341 to cause control of the phase circuits from switch from the first control loop to the second control loop. Rate comparator 327 is also coupled to provide the results of rate comparisons to the logic circuit 321. In addition to providing information regarding the comparisons themselves, rate comparator may also provide the actual rate itself (as received from rate calculator 325, which may provide it directly in alternative embodiments).

Figure 3C:
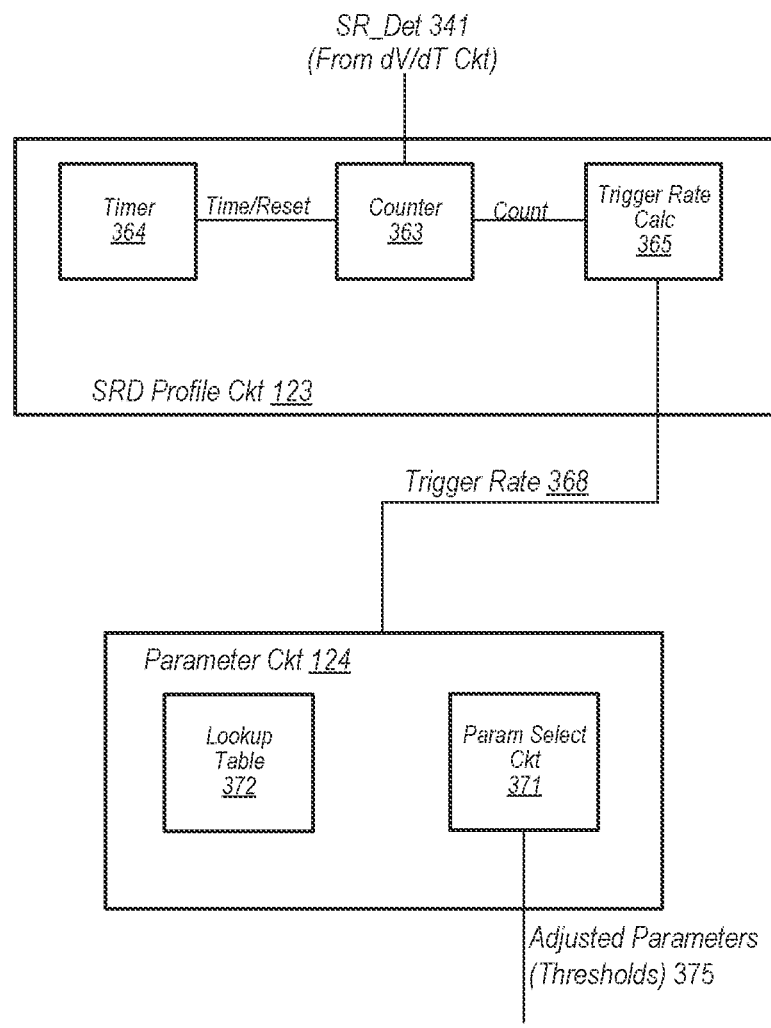
FIG. 3C is a block diagram illustrating components of a control loop used to set parameters for the embodiment of the slew rate detection circuit of FIG. 3B.

FIG. 3C is a block diagram of components of one embodiment of a third control loop according to the disclosure. In the embodiment shown, SRD profiled circuit 123 includes a counter circuit 363 that is coupled to receive the SR_Det signal from slew rate detection circuit, and count its assertions. The assertions may be calculated over an time interval in accordance with timer circuit 364, which may cause the counter to reset when the interval is complete. Trigger rate calculator circuit 365 may accumulate the count value over the interval, and calculate the trigger rate when counter circuit 363 is reset by timer circuit 364. The trigger rate 368 is then provided to parameter circuit 368.

In some embodiments, SRD profile circuit 123 may receive additional information regarding the triggering of the SR_Det signal 341, such as whether particular instances of assertion are in response to a positive-going rate of change or a negative-going rate of change. In such embodiments, additional circuitry may be provided. For example, separate counters may be provided for positive-going triggers of SR_Det 341 and negative-going triggers. Information regarding the actual rate change values that caused instances of triggering may also be provided. History information may also be recorded. Such information may be used by SRD profile circuit 123 to provide additional details to get a clearer picture of any voltage fluctuations and rate changes on regulated power supply line 105.

Parameter circuit 124 in the embodiment shown is coupled to receive information from SRD profile circuit 123 in order to generate parameters to provide to slew rate detection circuit 121. In this particular embodiment, parameter circuit 124 includes a parameter selection circuit 371 and a lookup table 372. Based on the trigger rate 368, parameter select circuit 371 may access lookup table 372 to determine parameters (e.g., thresholds) to be forwarded to slew rate detection circuit 121. These parameters may change from time to time based on changes to the value of trigger rate 368.

Other embodiments of parameter circuit 124 are possible and contemplated. For example, in embodiments in which SRD profile circuit 123 provides other information in addition to the trigger rate 368, an embodiment of parameter circuit 124 may implement a state machine or other circuit to generate thresholds and hysteresis information to be provided to slew rate detection circuit 121. This may include selecting upper and lower thresholds independently of one another, as well as adjusting a hysteresis value to prevent excess switching of control between the first and second control loops.

Figure 3D:
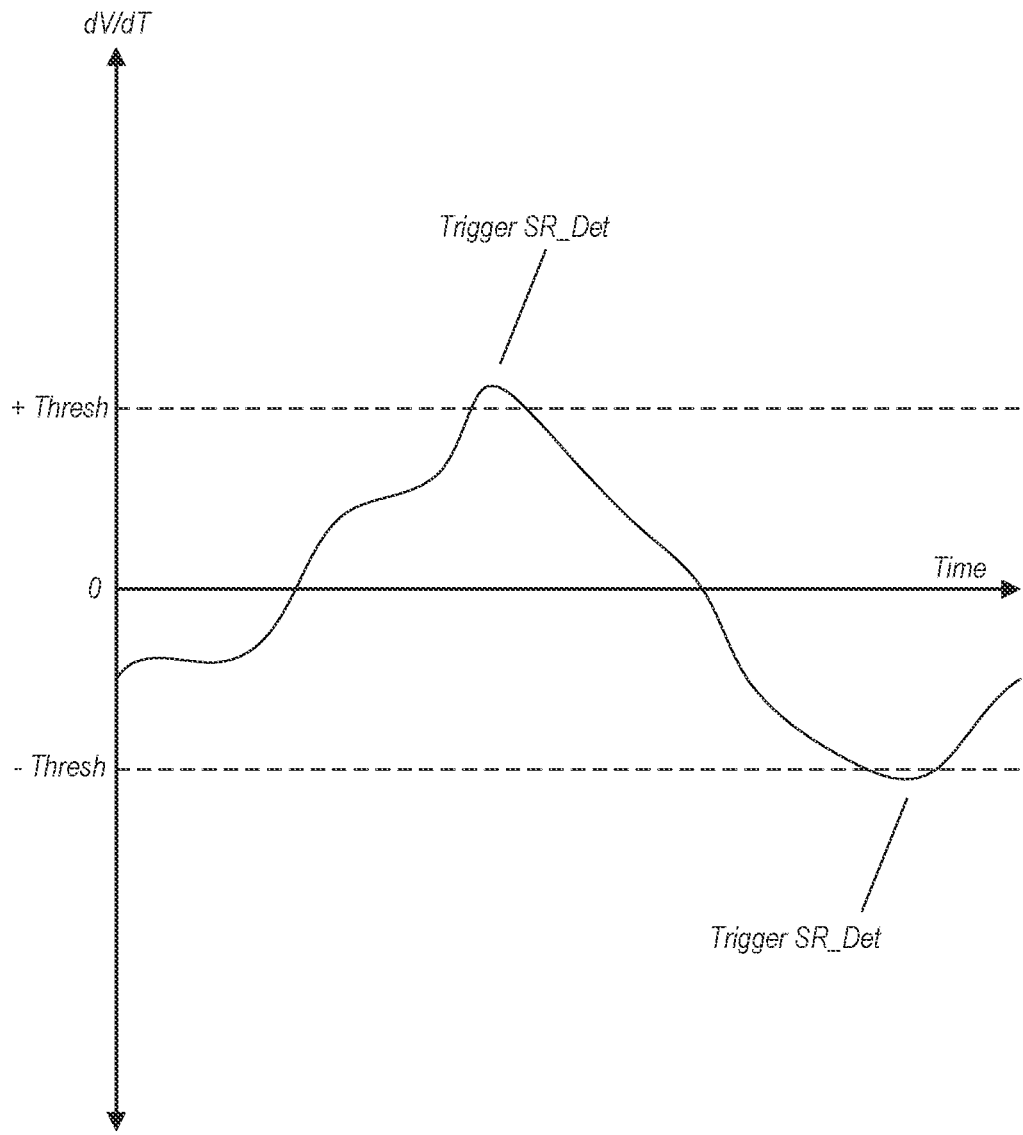
FIG. 3D is a graphic illustration of the operation of one embodiment of a slew rate detection circuit.

FIG. 3D is a graphic illustration of the operation of one embodiment of a slew rate detection circuit. In particular, FIG. 3D illustrates a fluctuations, over time, in a rate of change of a voltage on regulated supply voltage line 105, relative to a specified range that is defined by an upper threshold (+Thresh) and a lower threshold (−Thresh). When the rate of change of these voltages is between these two threshold, the threshold detect signal, SR_Det, remains de-asserted. In the example, as the rate of change drifts above the upper threshold, assertion of SR_Det is triggered, which causes control of the power convert to switch from the first control loop to the second control loop. This switch may allow the slew rate detection circuit to slow and eventually reverse the rate of change of the voltage level until it is back to within the specified range. The second control loop may, in some embodiments, maintain control of the phase circuits for a specified time after the rate of change moves back to within the specified range. However, control is eventually switched back to the first control loop when in the specified range.

The example continues with the rate of change eventually falling below the lower threshold, once again triggering assertion of the SR_Det circuit. Again, control is switched to the second control loop until the rate of change is back within the specified range (or sometime thereafter), after which control reverts to the first control loop.

Figure 4:
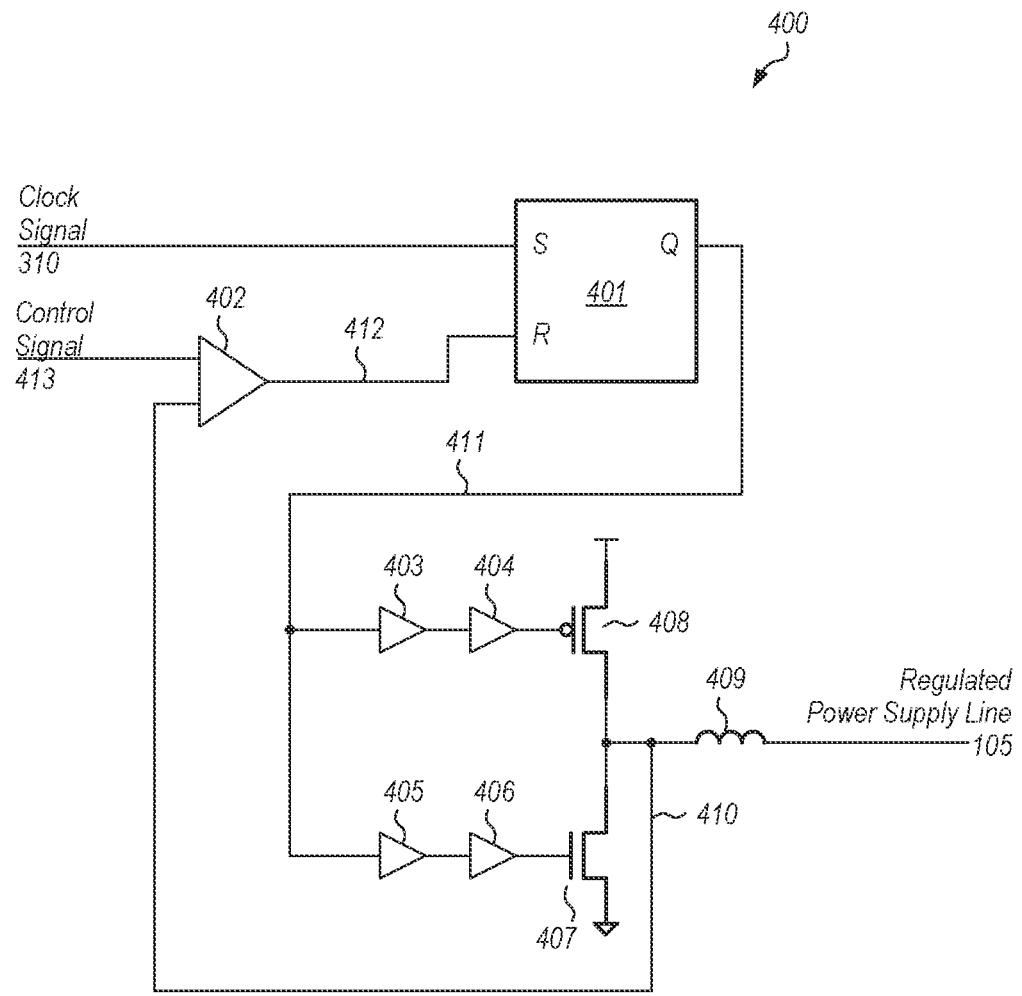
FIG. 4 illustrates a block diagram of an embodiment of a phase circuit.

A block diagram of an embodiment of a phase circuit (also referred to as a "phase unit") is depicted in FIG. 4. As illustrated, phase circuit 400 includes latch circuit 401, comparator circuit 402, buffer circuits 403-406, devices 407 and 408, and inductor 409.

Comparator circuit 402 may be a particular embodiment of a differential amplifier or other amplifier circuit configured to generate a digital output voltage level based on a comparison between the voltage levels of two input signals. As illustrated, comparator circuit 402 is configured to compare a voltage level of control signal 413 to a voltage level of circuit node 410 to generate a reset signal on node 412. In various embodiments, the voltage level of control signal 413 may correspond to a particular control current and the voltage level of circuit node 410 may correspond to a value of a current flowing through inductor 409 (referred to as a "sensed inductor current"). Comparator circuit 402 may, in various embodiments, be configured to generate a high logic value on node 412 when the voltage level of circuit node 410 is greater than or equal to the voltage level of control signal 413.

Latch circuit 401 may be a particular embodiment of a set-reset latch ("SR latch"). In various embodiments, a high logic level on clock signal 310 and a low logic level on node 412 sets latch circuit 401 resulting in a high logic level on node 411. Node 411 will remain at a high logic level until a high logic level is present on node 412, which resets latch circuit 401.

As used and described herein, a logical-0, logic 0 value, or low logic level, describes a voltage sufficient to activate a p-channel metal-oxide semiconductor field effect transistor (MOSFET), and a logical-1, logic 1 value, or high logic level describes a voltage level sufficient to activate an n-channel MOSFET. It is noted that, in various other embodiments, any suitable voltage levels for logical-0 and logical-1 may be employed.

Buffer circuits 403 and 404 are configured to provide additional drive and translate the logic level present on node 411 in order to activate and deactivate device 408, and buffer circuits 405 and 406 are configured to provide additional drive and translate the logic level present on node 411 in order to activate and deactivate device 407. For example, a high logic level on node 411 may be translated by buffer circuits 403 and 404 such that device 408 is activated, allowing current to flow through device 408 through inductor 409 and into a load circuit coupled to regulated power supply line 105. Additionally, buffer circuits 405 and 406 may translate the high logic level on node 411 such that device 407 is inactive.

When a low logic level is present on node 411, buffer circuits 403 and 404 may translate the low logic level such that device 408 is inactive, while buffer circuits 405 and 406 translate the low logic level such that device 407 is active, allowing current to flow from the load circuit through device 407 into the ground supply.

In various embodiments, buffer circuits 403-406 may include one or more inverter circuits. As used herein, inverter circuits may be particular embodiments of inverting amplifiers configured to generate an output signal with an opposite logical sense of an input signal. In other embodiments, any suitable type of inverting amplifier may be employed, including inverting amplifiers constructed with technologies other than CMOS.

Devices 407 and 408 may be particular embodiments of transconductance devices where the current flowing through such a device is based upon a voltage across the device. For example, in various embodiments, a device may be a p-channel or n-channel metal-oxide semiconductor field-effect transistor (MOSFET), a PNP or NPN bipolar transistor, or any other suitable transconductance device. In the illustrated embodiment, device 407 may be an n-channel MOSFET and device 408 may be a p-channel MOSFET.

Inductor 409, along with the remaining circuit elements of phase circuit 400, may be fabricated on a common silicon substrate. Alternatively, inductor 409 may be fabricated on a different substrate than the remaining circuit elements in phase circuit 400. A magnetic field generated by an inductor in a particular phase circuit may induce a current in an inductor in a different phase circuit. In some cases, inductors included in different phase circuits are physically oriented so as to allow each inductor to induce a desired amount of current in the other inductor. Inductors oriented in such a fashion are commonly referred to as being "mutually coupled inductors."

Figure 5:
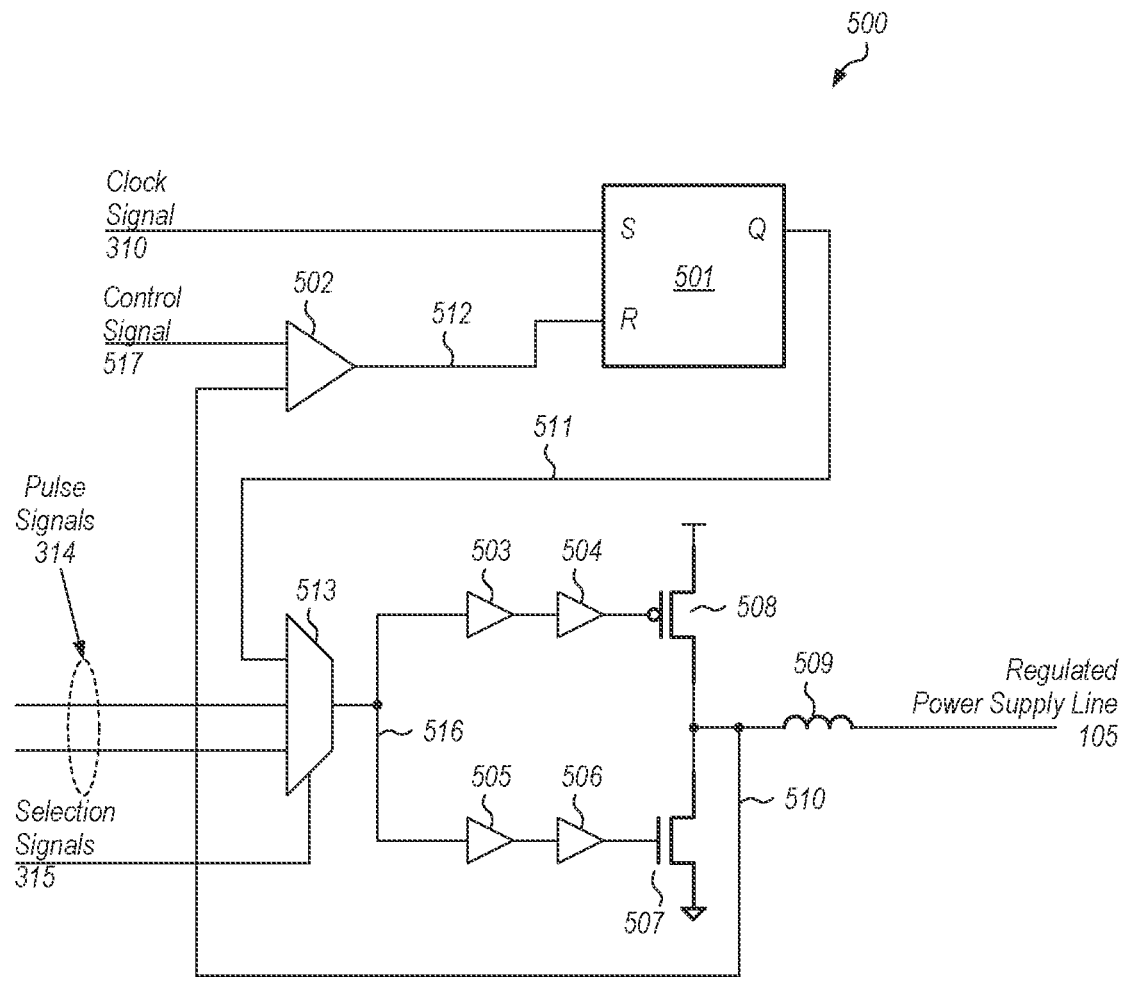
FIG. 5 illustrates a block diagram of another embodiment of a phase circuit.

As described below in more detail, bypassing a phase circuit's typical control path and directly introducing pulses into buffer circuits coupled to devices driving the inductor may improve the performance of a power converter or voltage regulator circuit. A block diagram of another embodiment of a phase circuit is illustrated in FIG. 5. As illustrated, phase circuit 500 includes latch circuit 501, comparator circuit 502, buffer circuits 503-506, devices 507 and 508, inductor 509, and multiplex circuit 513.

Like comparator circuit 402, comparator circuit 502 is configured to compare a voltage level of control signal 517 (which may be included in control signals 106) and a voltage level of node 510. Latch circuit 501, like its counterpart, latch circuit 401 in FIG. 4, is configured to set a high logic level on node 511 in response to a high logic level on clock signal 310 and a low logic level on node 512. In response to a high logic level on node 512, latch circuit 501 sets a low logic level on node 511. Buffer circuits 503-506, devices 507 and 508, and inductor 509 are configured to operate in a similar fashion to buffer circuits 403-406, devices 407 and 408, and inductor 409, respectively.

Multiplex circuit 513 is configured to selectively couple either node 511 or one of pulse signals 314 to node 516 using selection signals 315. When one of pulse signals 314 are coupled to node 516, the control path through latch circuit 501 is bypassed, activating devices 507 and 508 directly through buffer circuits 503-506. As described above in regard to FIG. 3A, pulse signals 314 may be generated using information retrieved from lookup table 302 in response to the voltage level of regulated power supply line 105 being below a threshold value. By activating devices 508 and 507 through the use of pulse signals 314 when phase circuit 500 would otherwise be inactive, allows phase circuit 500 to compensate for drops in the voltage of regulated power supply line 105 as well as providing additional current to a load circuit when other phase circuits are being initialized.

Multiplex circuit 513 may be designed according to one of various design styles. For example, in some embodiments, multiplex circuit 513 may include any suitable combination of static logic gates configured to implement the desired multiplex function. In other cases, multiplex circuit 513 may employ multiple pass gate or other suitable circuits arranged in a wired-OR fashion. A particular one of the pass gate circuits may be activated using selection signals 315. Although only two pulse signals are depicted in FIG. 5, any suitable number of pulse signals, each having a different duration, may be employed.

Figure 6A:
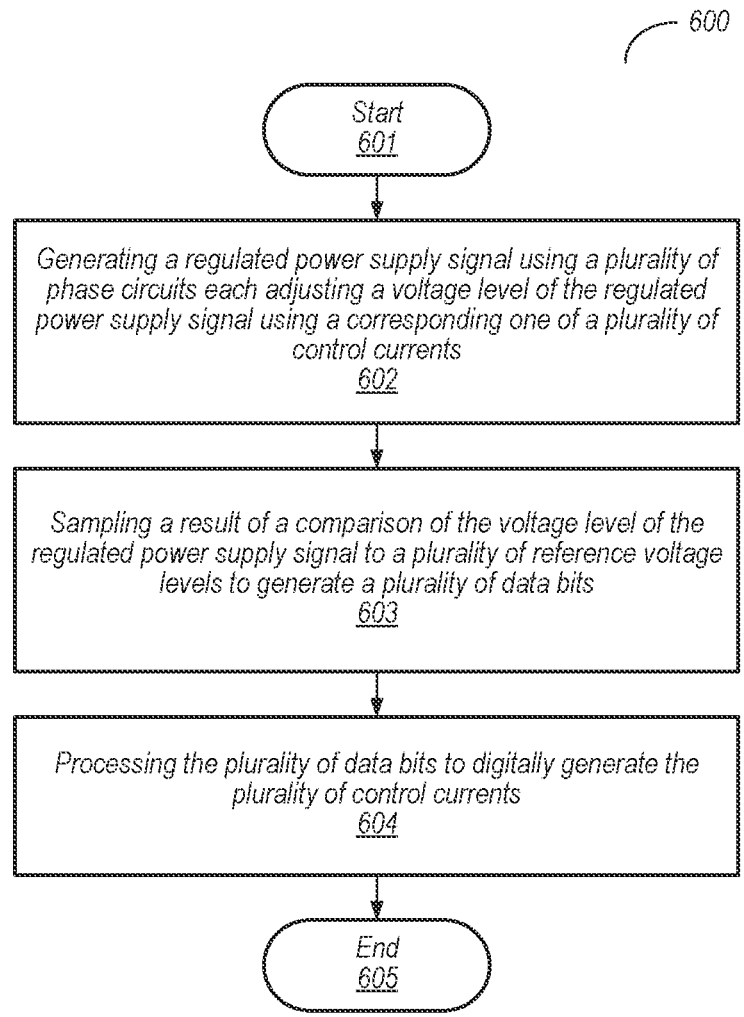
FIG. 6A illustrates a flow diagram depicting an embodiment of a method for operating a power converter circuit.

Turning to FIG. 6A, a flow diagram depicting an embodiment of a method for operating a power converter circuit is illustrated. Method 600, which may be applied to various power converter circuits, e.g., power converter circuit 100, begins in block 601.

The method includes generating a regulated power supply signal using a plurality of phase circuits each adjusting a voltage level of the regulated power supply signal using a corresponding one of a plurality of control currents (block 602). In various embodiments, each phase circuit may adjust the voltage level of the regulated power supply signal by either sourcing or sinking current from the signal line of the regulator power supply signal. Each of the phase circuits is activated using a corresponding clock signal or other timing reference signal, and is deactivated based on a comparison of its associated control current with a respective current sensed at the output of the phase circuit. In some embodiments, the method includes comparing a particular control current of the plurality of control currents to a sensed inductor current, generating a reset signal using results of comparing the particular control current of the plurality of control currents to the sensed inductor current, and resetting a flip-flop circuit using the reset signal to deactivate a corresponding phase circuit.

The method also includes sampling a result of a comparison of the voltage level of the regulated power supply signal to a plurality of reference voltage levels to generate a plurality of data bits (block 603). In various embodiments, the voltage level of the regulated supply signal is compared to the plurality of reference voltage levels using a flash analog-to-digital converter or other suitable circuit. Such reference voltage levels may be generated using a resistive voltage divider coupled to a primary voltage reference.

The method further includes processing the plurality of data bits to digitally generate the plurality of control currents (block 604). In some embodiments, processing the plurality of data bits includes generating a plurality of output codes, and converting each output code of the plurality of output codes to a corresponding one of the plurality of control currents using a respective one of a plurality of digital-to-analog converter circuits. In some cases, the method also includes storing each output code of the plurality of output codes in a respective one of a plurality of register circuits, and activating each register circuit of the plurality of register circuits using a clock signal. The method ends in block 605.

In some cases, once a phase circuit has been de-activated, e.g., setting latch circuit 401 by control signal 413, the phase circuit cannot react to changes in the voltage level of a regulated power supply signal until a subsequent pulse on clock signal 310. Since the circuit cannot react, the voltage level of the regulated power supply signal may drop below a target level.

Additionally, when a power converter or voltage regulator circuit is initially activated, certain analog circuit components, e.g., comparator circuit 402, may initialize and stabilize over a period of time. During such times, the power converter or voltage regulator circuit may be unable to maintain the voltage level of the regulated power supply signal at the target level.

Figure 6B:
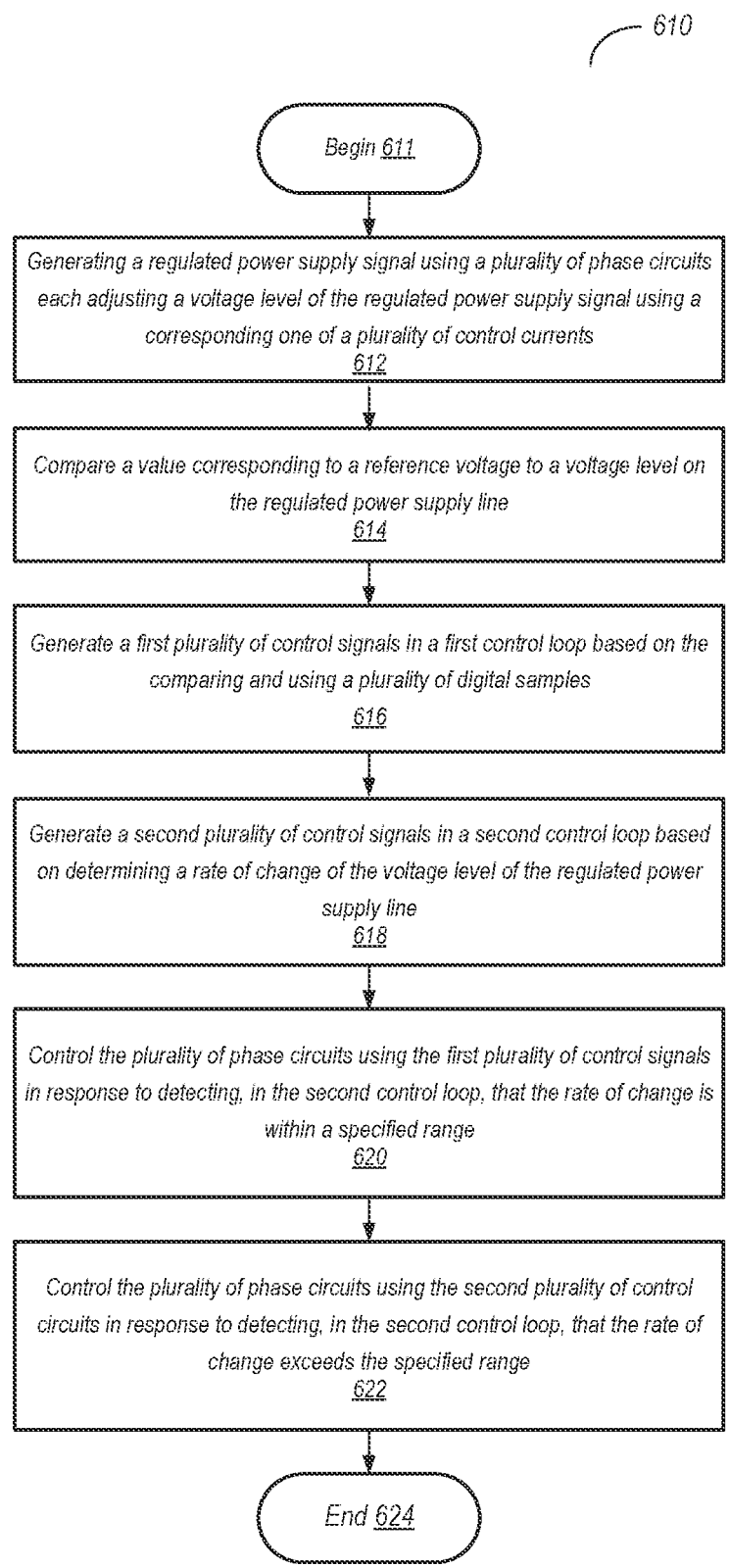
FIG. 6B illustrates a flow diagram depicting an embodiment of a method for operating a power converter circuit with slew rate detection.

FIG. 6B illustrates a flow diagram depicting an embodiment of a method for operating a power converter circuit with slew rate detection. Method 610, which may be applied to various power converter circuits, e.g., power converter circuit 120, begins in block 611.

The method includes generating, using ones of a plurality of phase circuits coupled to a regulated power supply line via corresponding ones of a plurality of inductors, a voltage level of the regulated power supply line using respective ones of a plurality of control signals (block 612). Method 600 further includes comparing a value corresponding to a reference voltage to a voltage level on the regulated power supply line (block 614). Various control signals are generated in the method, which includes generating a first plurality of control signals in a first control loop based on the comparing and using a plurality of digital samples (block 616) and generating a second plurality of control signals in a second control loop based on determining a rate of change of the voltage level of the regulated power supply line (block 618). The control of the phase circuits may be passed between the first and second control loops. Accordingly, the method includes controlling the plurality of phase circuits using the first plurality of control signals in response to detecting, in the second control loop, that the rate of change is within a specified range (block 620) and controlling the plurality of phase circuits using the second plurality of control circuits in response to detecting, in the second control loop, that the rate of change exceeds the specified range (block 622). The method ends at block 624.

In various embodiments, the method includes an analog-to-digital converter generating the plurality of digital samples using the voltage level of the regulated power supply line. Such method embodiments may also include performing, using a slew rate detection circuit, a comparison of the plurality of digital samples to one or more thresholds to determine if the rate of change exceeds the specified range and causing the first plurality of control signals or the second to be provided to the plurality of phase circuits based on the comparison.

Various embodiments also include the operation of a third control loop. These method embodiments include determining, using a profiler circuit a trigger rate at which the second control loop switches control between the first and second control loops and adjusting, based on the trigger rate and using a parameter circuit, the specified range.

Some embodiments of the method include causing, using the slew rate detection circuit, the plurality of phase circuits to increase an amount of current provided from the regulated power supply line in response to detecting a negative rate of change outside of the specified range. Embodiments of the method are also possible and contemplated that include causing, using the slew rate detection circuit, the plurality of phase circuits to decrease an amount of current provided from the regulated power supply line in response to detecting a positive rate of change outside of the specified range.

Figure 6C:
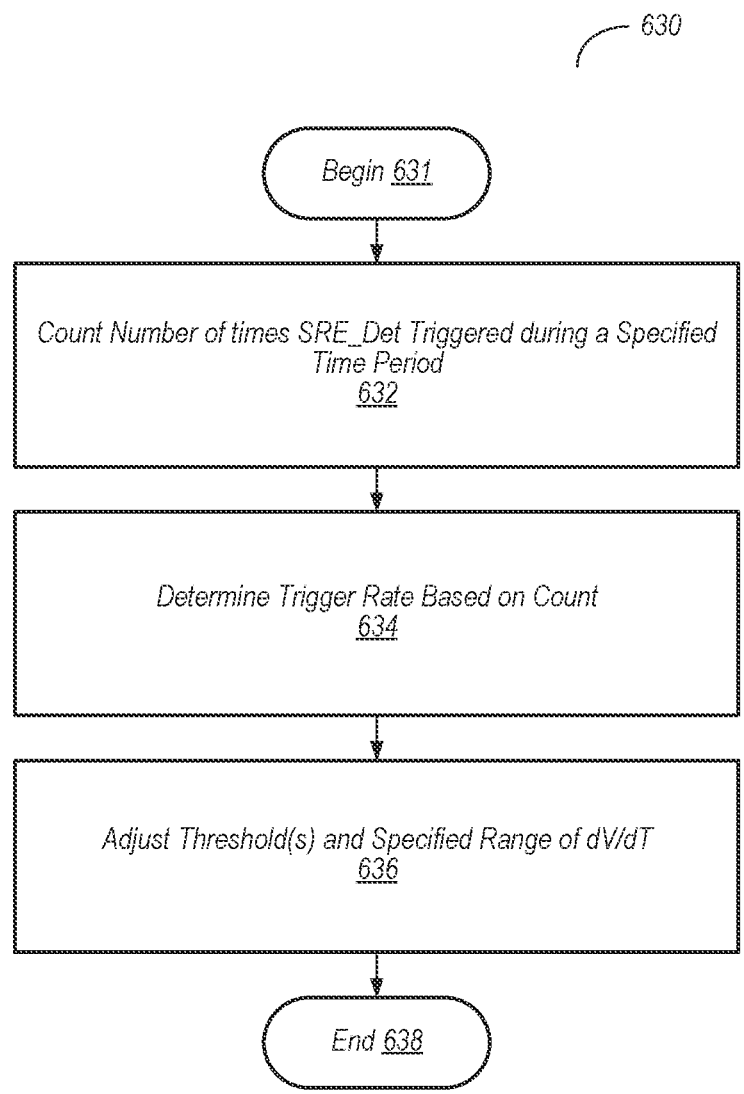
FIG. 6C illustrates a flow diagram depicting an embodiment of a method for operating a control loop used to set parameters for a slew rate detection circuit.

FIG. 6C is a flow diagram of a method for operating a third control loop that is used to set parameters for the second control loop. Method 630 of FIG. 6C begins operation at block 631.

The method for operating the third control loop includes counting a number of times a detection signal (SR_Det) is triggered during a specified time period (block 632). In various embodiments, the method also includes determining a trigger rate based on the count (block 634). Based on the trigger rate, the method includes adjusting a specified range of change (dV/dT) of the voltage output from the power converter (block 636). The method concludes at block 638. Using this method to adjust and refine parameters of operation of the second control loop may aid in preventing excess switching between the first and second control loops. This in turn may lead to more efficient operation of the power converters.

Figure 7:
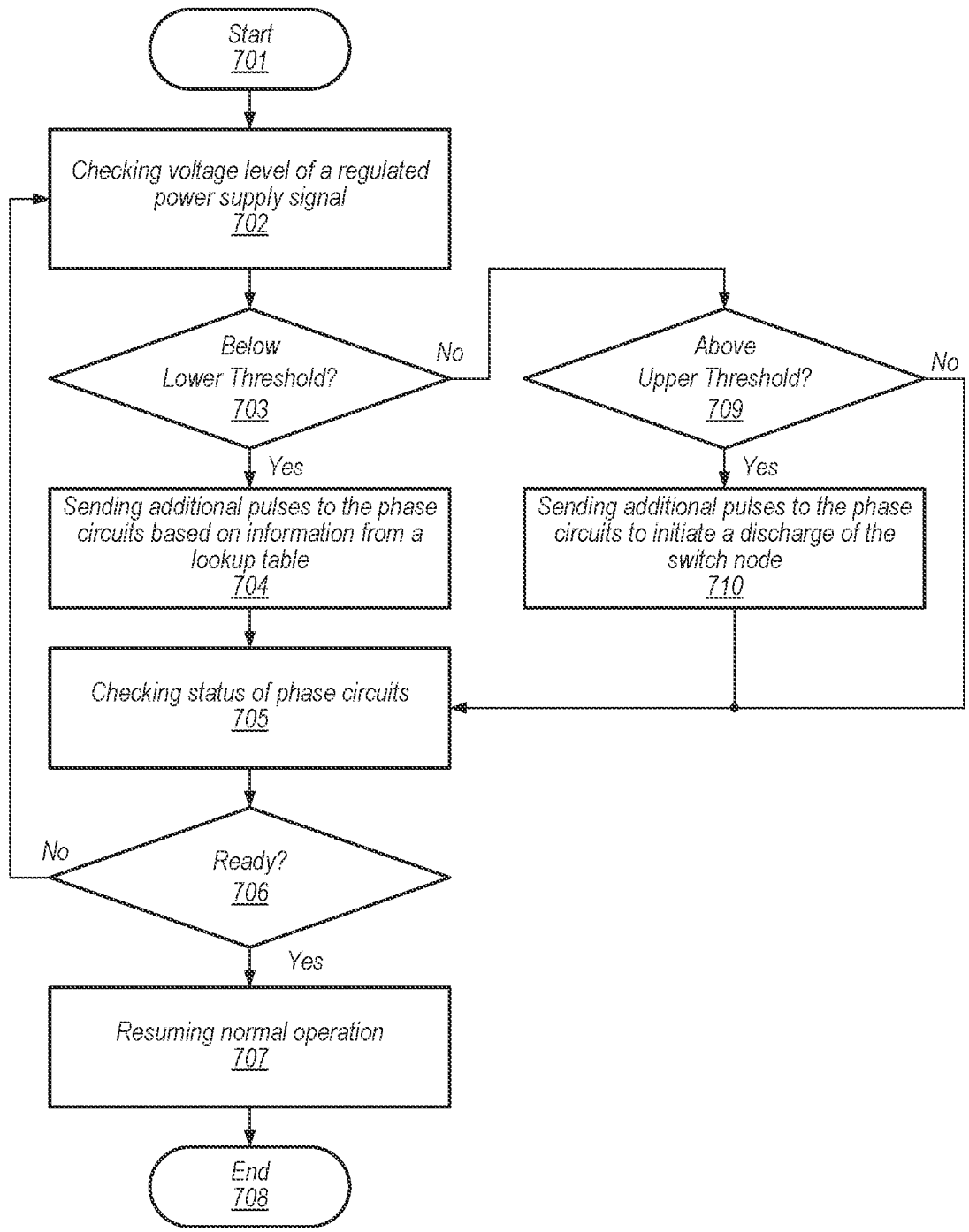
FIG. 7 illustrates a flow diagram depicting an embodiment of another method for operating a power converter circuit.

To improve performance of a power converter or voltage regulator circuit during the circumstances described above, additional pulses may be sent to one or more of the phase circuits included in the power converter or voltage regulator circuit to increase a frequency of activity within the power converter or voltage regulator circuit. A flow diagram depicting another embodiment of a method for employing additional pulses to the phase circuits in a power converter circuit is illustrated in FIG. 7. The method, which may be applied to various power converter circuits, e.g., power converter circuit 100 of FIG. 1A, or power converter 120 of FIG. 1B, begins in block 701.

The method includes checking a voltage level of a regulated power supply signal (block 702). In various embodiments, checking the voltage level of the regulated power supply signal may include comparing the voltage level of the regulated power supply signal to one or more threshold values. The method may then depend on a result of checking the voltage level of the regulated power supply signal (block 703).

If the voltage level of the regulated power supply signal is less than a lower threshold value, then the method includes sending additional pulses to the phase circuits based on information from a lookup table (block 704). In various embodiments, the lookup table may include multiple entries, each specifying a number of additional pulses to be sent to the phase circuits based on the voltage level of the regulated power supply signal, a difference between the voltage level of the regulated power supply signal and a threshold value, or any other suitable criterion. The information stored in the lookup table may allow for additional pulses to be sent to a single phase circuit or multiple phase circuits.

The method also includes checking the status of the phase circuits (block 705). During operation of the power converter circuit, phase circuits may be enabled or disabled based on power requirements of load circuits coupled to the power converter circuits. In various embodiments, it may take a period of time for certain circuits within a particular phase circuit to initialize once the particular phase circuit has been enabled.

If the voltage level of the regulated power supply signal is greater than the lower threshold value, the method may depend on a comparison of the voltage level of the regulated power supply signal to an upper threshold value (block 709). If the voltage level of the regulated power supply signal is greater than the upper threshold value, the method includes sending additional pulses to the phase circuits to initiate a discharge of the switch node (block 710). By checking the voltage level of the regulated power supply signal against the upper threshold value, overshoot resulting from the additional pulses generated in block 704 may be limited, thereby keeping the voltage level of the regulated power supply signal close to the desired voltage level. Following the sending of the pulses to discharge the switch node, the method may then proceed from block 705 as described above.

If the voltage level of the regulated power supply signal is less than the upper threshold, then the method proceeds from block 705 as described above. The method may then depend on the status of the phase circuits (block 706).

If the phase circuits are ready, the method includes resuming normal operation (block 707). Alternatively, if the phase circuits are not ready, then the method proceeds from block 702 as described above. The method concludes in block 708.

Figure 8:
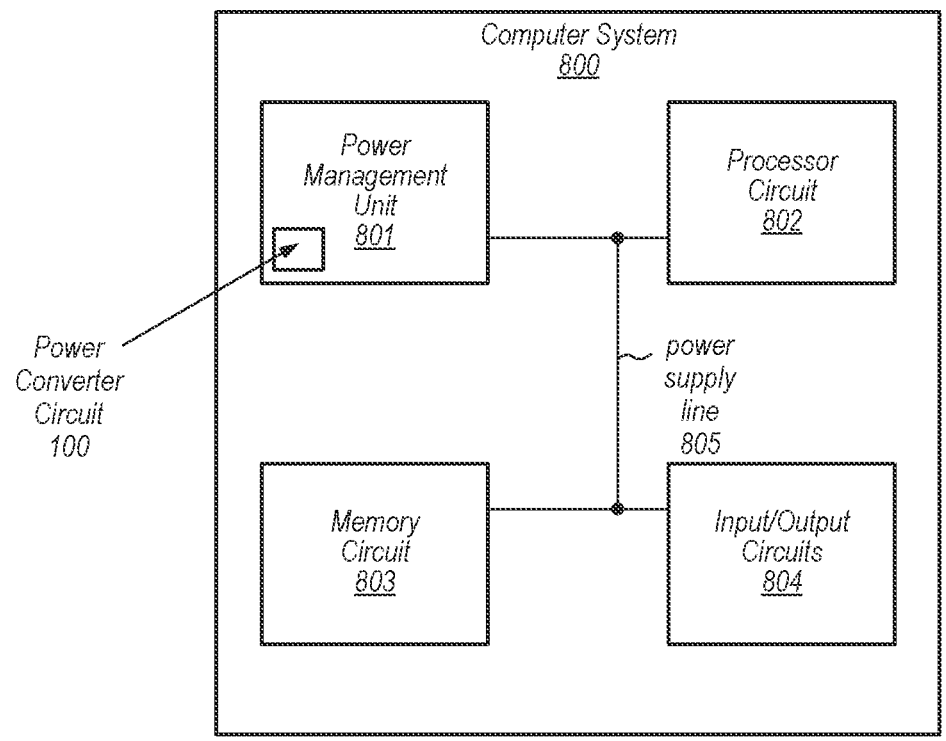
FIG. 8 is a block diagram of one embodiment of a computer system that includes a power converter circuit.

A block diagram of a computer system is illustrated in FIG. 8. In the illustrated embodiment, computer system 800 includes power management unit 801, processor circuit 802, memory circuit 803, and input/output circuits 804, each of which is coupled to power supply line 805. In various embodiments, computer system 800 may be a system-on-a-chip (SoC) and/or be configured for use in a desktop computer, server, or in a mobile computing application such as, e.g., a tablet, laptop computer, or wearable computing device.

Power management unit 801 includes power converter circuit 100 which is configured to generate a regulated voltage level on power supply line 805 in order to provide power to processor circuit 802, input/output circuits 804, and memory circuit 803. Although power management unit 801 is depicted as including a single power converter circuit, in other embodiments, any suitable number of power converter circuits may be included in power management unit 801, each configured to generate a regulated voltage level on a respective one of multiple power supply signals included in computer system 800. When multiple power converter circuits are employed, each one may be separately configured by storing information in a corresponding lookup table, as well as initializing sequential logic circuits or register circuits included within a logic circuit, e.g., logic circuit 301, included in each power converter circuit.

Processor circuit 802 may, in various embodiments, be representative of a general-purpose processor that performs computational operations. For example, processor circuit 802 may be a central processing unit (CPU) such as a microprocessor, a microcontroller, an application-specific integrated circuit (ASIC), or a field-programmable gate array (FPGA).

Memory circuit 803 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 8, in other embodiments, any suitable number of memory circuits may be employed.

Input/output circuits 804 may be configured to coordinate data transfer between computer system 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 804 may be configured to implement a version of Universal Serial Bus (USB) protocol or IEEE 1394 (Firewire C)) protocol.

Input/output circuits 804 may also be configured to coordinate data transfer between computer system 800 and one or more devices (e.g., other computing systems or integrated circuits) coupled to computer system 800 via a network. In one embodiment, input/output circuits 804 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 804 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus comprising:
a plurality of phase circuits coupled to a regulated power supply line via corresponding ones of a plurality of inductors, wherein the plurality of phase circuits are configured to modify a voltage level of the regulated power supply line using respective ones of a plurality of control signals;
a first control loop configured to generate, using a plurality of digital samples and based on comparisons of a value corresponding to a reference voltage to the voltage level on the regulated power supply line, a first plurality of control signals;
a second control loop configured to, using the plurality of digital samples, generate a second plurality of control signals based on determining a rate of change of the voltage level of the regulated power supply line, and further configured to:
cause the first control loop to control the plurality of phase circuits, using the first plurality of control signals, in response to detecting that the rate of change is within a specified range; and
cause the second control loop to control the plurality of phase circuits, using the second plurality of control signals, in response to detecting that the rate of change exceeds the specified range.

2. The apparatus of claim 1, further comprising an analog-to-digital converter (ADC) circuit configured to convert the voltage level on the regulated power supply line into the plurality of digital samples.

3. The apparatus of claim 2, further comprising a slew rate detection circuit configured to:
perform a comparison of the plurality of digital samples to one or more thresholds to detect if the rate of change exceeds the specified range; and
cause one of the first plurality of control signals or the second plurality of control signals to be provided to the plurality of phase circuits based on the comparison.

4. The apparatus of claim 3, further comprising a third control loop, wherein the third control loop includes:
a profiler circuit coupled to the slew rate detection circuit, wherein the profiler circuit is configured to determine a trigger rate at which the second control loop switches control between the first and second control loops; and
a parameter circuit coupled between the profiler circuit and the slew rate detection circuit and configured to adjust the specified range based on the trigger rate.

5. The apparatus of claim 3, wherein the slew rate detection circuit is configured to, using the second plurality of control signal, activate one or inactive ones of the plurality of phase circuits in response to detecting a negative rate of change outside of the specified range.

6. The apparatus of claim 3, wherein the slew rate detection circuit is configured to, using the second plurality of control signals and in response to detecting a negative rate of change outside of the specified range, increase a switching duty cycle of one or more of the plurality of phase circuits.

7. The apparatus of claim 3, wherein the slew rate detection circuit is configured to, using the second plurality of control signals and in response to detecting a negative rate of change outside of the specified range, increase a switching cycle of one or more of the plurality of phase circuits.

8. The apparatus of claim 3, wherein the slew rate detection circuit is configured to, using the second plurality of control signals and in response to detecting a positive rate of change outside of the specified range, deactivate one or more of active ones of the plurality of phase circuits.

9. The apparatus of claim 3, wherein the slew rate detection circuit is configured to, using the second plurality control signals and in response to detecting a positive rate of change outside of the specified range, reduce a switching frequency of one or more active ones of the plurality of phase circuits.

10. The apparatus of claim 2, wherein the first control loop includes a digital control circuit coupled to receive the plurality of digital samples and configured to generate, using the plurality of digital samples and results of the comparisons, a plurality of control words.

11. The apparatus of claim 10, wherein the digital control circuit includes a plurality of digital-to-analog converters configured to, using the plurality of control words, generate the first plurality of control signals.

12. A method comprising:
generating, using ones of a plurality of phase circuits coupled to a regulated power supply line via corresponding ones of a plurality of inductors, a voltage level of the regulated power supply line using respective ones of a plurality of control signals;
comparing a value corresponding to a reference voltage to a voltage level on the regulated power supply line;
generating a first plurality of control signals in a first control loop based on the comparing and using a plurality of digital samples;
generating a second plurality of control signals in a second control loop based on determining a rate of change of the voltage level of the regulated power supply line;
controlling the plurality of phase circuits using the first plurality of control signals in response to detecting, in the second control loop, that the rate of change is within a specified range; and
controlling the plurality of phase circuits using the second plurality of control signal in response to detecting, in the second control loop, that the rate of change exceeds the specified range.

13. The method of claim 12, further comprising an analog-to-digital converter generating the plurality of digital samples using the voltage level of the regulated power supply line.

14. The method of claim 13, further comprising:
performing, using a slew rate detection circuit, a comparison of the plurality of digital samples to one or more thresholds to determine if the rate of change exceeds the specified range;
causing the first plurality of control signals to be provided to the plurality of phase circuits if the rate of change is less than the specified range; and
causing the second plurality of control signals to be provided to the plurality of phase circuits if the rate of change exceeds the specified range.

15. The method of claim 14, further comprising:
determining, using a profiler circuit a trigger rate at which the second control loop switches control between the first and second control loops; and
adjusting, based on the trigger rate and using a parameter circuit, the specified range.

16. The method of claim 14, further comprising causing, using the slew rate detection circuit, the plurality of phase circuits to increase an amount of current provided from the regulated power supply line in response to detecting a negative rate of change outside of the specified range.

17. The method of claim 14, further comprising causing, using the slew rate detection circuit, the plurality of phase circuits to decrease an amount of current provided from the regulated power supply line in response to detecting a positive rate of change outside of the specified range.

18. A system comprising:
a plurality of circuit blocks coupled to a power supply line; and
a power management circuit that includes a power converter circuit including a plurality of phase circuits, wherein the power management circuit is configured to:
generate a plurality of digital samples using a voltage level on the power supply line;
generate, using the plurality of digital samples and based on comparisons of a reference voltage value to the voltage level on the power supply line, a first plurality of control signals;
generate, using the plurality of digital samples and based on determining a rate of change of the voltage level of the power supply line, a second plurality of control signals;
control the plurality of phase circuits using the first plurality of control signals in response to determining that the rate of change is within a specified range; and
control the plurality of phase circuits using the second plurality of control signals in response to determining that the rate of change is not within the specified range.

19. The system of claim 18, wherein the power management circuit includes:
a first control loop configured to provide the first plurality of control signals to the phase circuits, wherein the first control loop includes a digital control circuit configured to generate the first plurality of control signals, using the plurality of digital samples, based on a comparison of the voltage level on the power supply line to a value of a reference voltage;
a second control loop, wherein the second control loop includes a slew rate detection circuit configured to, using the plurality of digital samples:
determine a rate of change of the voltage level on the power supply line;
compare the rate of change to one or more thresholds to determine if the rate of change is within the specified range; and
assert a trigger signal in response to determining that the rate of change is not within the specified range; and
a plurality of selection circuits, wherein the plurality of selection circuits are configured to cause the first plurality of control signals to be provided to the plurality of phase circuits if the trigger signal is not asserted, and further configured to cause the second plurality of control signals to be provided to the plurality of phase circuits if the trigger signal is asserted.

20. The system of claim 19, wherein the power management circuit further includes a third control loop, wherein the third control loop includes:
a profiler circuit configured to determine a rate at which the trigger signal is asserted by the slew rate detection circuit; and
a parameter circuit coupled between the profiler circuit and the slew rate detection circuit, wherein the parameter circuit is configured to adjust the specified range based on the rate at which the trigger signal is asserted.

* * * * *